United States Patent [19]
Khanarian et al.

[11] Patent Number: 6,126,992
[45] Date of Patent: *Oct. 3, 2000

[54] OPTICAL ARTICLES COMPRISING ISOSORBIDE POLYESTERS AND METHOD FOR MAKING SAME

[75] Inventors: Garo Khanarian, Berkeley Heights; Larry F. Charbonneau, Mendham, both of N.J.; Helmut B. Witteler, Beindersheim, Germany

[73] Assignee: E.I. DuPont de Nemours and Company, Wilmington, Del.

[ * ] Notice: This patent is subject to a terminal disclaimer.

[21] Appl. No.: 09/064,846

[22] Filed: Apr. 23, 1998

[51] Int. Cl.[7] .............................. B05D 5/06; B32B 3/00; B32B 27/36; C08G 63/42

[52] U.S. Cl. ..................... 427/162; 427/384; 428/644; 428/64.6; 428/480

[58] Field of Search ...................... 528/298, 300; 428/64.4, 480, 64.6; 427/162, 384

[56] References Cited

U.S. PATENT DOCUMENTS

| | | | |
|---|---|---|---|
| Re. 33,748 | 11/1991 | Meyborg et al. | 521/176 |
| 2,985,995 | 5/1961 | Bunting, Jr. et al. . | |
| 3,199,281 | 8/1965 | Maerov et al. . | |
| 3,684,766 | 8/1972 | Jackson, Jr. et al. . | |
| 3,785,993 | 1/1974 | Langhans . | |
| 3,795,627 | 3/1974 | Langhans et al. . | |
| 3,859,445 | 1/1975 | Langhans . | |
| 3,871,947 | 3/1975 | Brekken . | |
| 3,966,867 | 6/1976 | Munting . | |
| 4,146,663 | 3/1979 | Ikeda et al. . | |
| 4,157,419 | 6/1979 | Mirhej . | |
| 4,159,617 | 7/1979 | Allan . | |
| 4,195,161 | 3/1980 | Davis et al. . | |
| 4,209,559 | 6/1980 | Wada et al. . | |
| 4,223,128 | 9/1980 | Halek et al. . | |
| 4,225,549 | 9/1980 | Allan . | |
| 4,231,922 | 11/1980 | Robeson . | |
| 4,246,381 | 1/1981 | Robeson . | |
| 4,255,301 | 3/1981 | Minagawa et al. . | |
| 4,259,458 | 3/1981 | Robeson . | |
| 4,259,478 | 3/1981 | Jackson, Jr. et al. . | |
| 4,294,956 | 10/1981 | Berger et al. . | |
| 4,294,957 | 10/1981 | Berger et al. . | |
| 4,351,917 | 9/1982 | Calundann et al. . | |
| 4,352,927 | 10/1982 | Cogswell et al. . | |
| 4,355,080 | 10/1982 | Zannucci . | |
| 4,374,239 | 2/1983 | Berger et al. . | |
| 4,383,051 | 5/1983 | Meyborg et al. . | |
| 4,383,923 | 5/1983 | Elfert . | |
| 4,386,186 | 5/1983 | Maresca et al. . | |
| 4,408,061 | 10/1983 | Salzburg et al. . | |
| 4,413,116 | 11/1983 | Reuter et al. . | |
| 4,418,174 | 11/1983 | Dhein et al. . | |
| 4,435,562 | 3/1984 | Sullivan et al. . | |
| 4,438,226 | 3/1984 | Dirlikov et al. . | |
| 4,439,586 | 3/1984 | Kawakami et al. . | |
| 4,443,563 | 4/1984 | Dirlikov et al. . | |
| 4,456,729 | 6/1984 | Dhein et al. . | |
| 4,474,918 | 10/1984 | Seymour et al. . | |
| 4,506,066 | 3/1985 | Medem et al. . | |
| 4,506,086 | 3/1985 | Salzburg et al. . | |
| 4,526,923 | 7/1985 | Hornbaker et al. . | |
| 4,551,520 | 11/1985 | Morris et al. . | |
| 4,557,982 | 12/1985 | Nouda et al. . | |
| 4,564,645 | 1/1986 | Salzburg et al. . | |
| 4,587,071 | 5/1986 | Minami et al. . | |
| 4,605,729 | 8/1986 | Barnes et al. . | |
| 4,663,415 | 5/1987 | Grögler et al. . | |
| 4,687,830 | 8/1987 | Weber et al. . | |
| 4,713,436 | 12/1987 | Downs et al. . | |
| 4,725,647 | 2/1988 | Maresca et al. . | |
| 4,805,788 | 2/1989 | Akiho . | |
| 4,814,426 | 3/1989 | Utsumi et al. . | |
| 4,863,046 | 9/1989 | Collette et al. . | |
| 4,993,566 | 2/1991 | Eberle . | |
| 4,993,567 | 2/1991 | Eberle, Jr. . | |
| 5,005,716 | 4/1991 | Eberle . | |
| 5,021,289 | 6/1991 | Light et al. . | |
| 5,108,675 | 4/1992 | Matsuo et al. . | |
| 5,120,822 | 6/1992 | Hoeschele et al. . | |
| 5,124,388 | 6/1992 | Pruett et al. . | |
| 5,141,120 | 8/1992 | Brown et al. . | |
| 5,141,121 | 8/1992 | Brown et al. . | |
| 5,153,302 | 10/1992 | Masuda et al. . | |
| 5,164,478 | 11/1992 | Lee et al. . | |
| 5,179,143 | 1/1993 | König et al. . | |
| 5,296,550 | 3/1994 | Natarajan et al. . | |

(List continued on next page.)

FOREIGN PATENT DOCUMENTS

| | | |
|---|---|---|
| 0 033089A2 | 8/1981 | European Pat. Off. . |
| 0102 596 A2 | 3/1984 | European Pat. Off. . |
| 96/38282 | 12/1996 | European Pat. Off. . |
| 96/38498 | 12/1996 | European Pat. Off. . |
| 97/00284 | 1/1997 | European Pat. Off. . |
| 1263981 | 3/1968 | Germany . |
| 3229412 A1 | 2/1984 | Germany . |
| 4415353 A1 | 11/1994 | Germany . |
| 195 19 577 | 5/1995 | Germany . |
| 195 19 578 | 5/1995 | Germany . |
| 195 28 336 | 8/1995 | Germany . |
| 195 04 913 | 8/1996 | Germany . |
| 195 38 700 | 4/1997 | Germany . |
| 52018832A | 7/1975 | Japan . |
| 1079686 | 8/1967 | United Kingdom . |
| 1354446 | 5/1974 | United Kingdom . |
| 1408036 | 10/1975 | United Kingdom . |

OTHER PUBLICATIONS

D. Braun et al., "Polyesters with 1.4:3.6–dianhydrosorbitol as polymeric plasticizers for PVC," Die Angewandte Makromolekulare Chemie 199, pp. 191–205 (1992).

(List continued on next page.)

*Primary Examiner*—Tae Yoon
*Attorney, Agent, or Firm*—Burns, Doane, Swecker & Mathis, LLP

[57] ABSTRACT

An optical article made of a transparent polymer which includes terephthaloyl moieties, optionally, other aromatic diacid moieties; ethylene glycol moieties; isosorbide moieties; and, optionally, one or more other diol moieties, wherein the polymer has an inherent viscosity of at least about 0.35 dL/g as measured on a 1% solution (weight/volume) in o-chlorophenol at 25° C.

22 Claims, No Drawings

U.S. PATENT DOCUMENTS

| | | |
|---|---|---|
| 5,321,056 | 6/1994 | Carson et al. . |
| 5,382,474 | 1/1995 | Adhya et al. . |
| 5,409,756 | 4/1995 | Ikeda et al. . |
| 5,409,967 | 4/1995 | Carson et al. . |
| 5,412,005 | 5/1995 | Bastioli et al. . |
| 5,484,632 | 1/1996 | Mercer, Jr. et al. . |
| 5,496,887 | 3/1996 | Braune . |
| 5,573,831 | 11/1996 | Suzuki et al. . |
| 5,596,888 | 1/1997 | McLarty, III et al. . |
| 5,607,757 | 3/1997 | Dalton . |
| 5,616,404 | 4/1997 | Sublett . |
| 5,646,236 | 7/1997 | Schafheutle et al. . |
| 5,648,152 | 7/1997 | Diaz-Kotti et al. . |
| 5,654,083 | 8/1997 | Venema . |
| 5,656,719 | 8/1997 | Stibal et al. . |
| 5,709,929 | 1/1998 | Venema . |
| 5,721,397 | 2/1998 | Weinberg . |
| 5,747,175 | 5/1998 | Dietz et al. . |
| 5,766,679 | 6/1998 | Siemensmeyer et al. . |
| 5,958,581 | 9/1999 | Khanarian et al. ............ 428/357 |

OTHER PUBLICATIONS

D. Braun et al., "Grafting of polyesters by free–radical chain transfer," Die Angewandte Makromolekulare Chemie 210, pp. 173–196 (1993).

Estelle Cognet–Georjon et al., "New polyurethanes based on diphenylmethane diisocyanate and 1,4:3,6–dianhydrosorbitol, 1," Macromol. Chem. Phys. 196, pp. 3733–3751 (1995).

Estelle Cognet–Georjon et al., "New polyurethanes based on 4,4'–diphenylmethane diisocyanate and 1,4:3,6 dianhydrosorbitol, $2^{a)}$" Macromol. Chem. Phys. 197, pp. 3593–3612 (1996).

Hans R. Kricheldorf et al., "Chiral thermotropic copoly(ester–imide)s based on isosorbide$^{b)}$ and N–(4–carboxyphenyl)trimellitimide," Macromol. Rapid Commun. 16, pp. 231–237 (1995).

Hans R. Kricheldorf et al., "New Polymer Synthesis. LXXXII. Syntheses of Poly(ethersulfone)s from Silylated Aliphatic Diols Including Chiral Monomers," Journal of Polymer Science: Part A: Polymer Chemistry, vol. 33, pp. 2667–2671 (1995).

Hans R. Kricheldorf et al., "LC–polyimides 26. Photoreactive, nematic or cholesteric poly(ester–imide)s derived from 4–aminocinnamic acid trimellitimide, isosorbide and various diphenols," High Perform. Polym., 7, pp. 471–480 (1995).

Hans R. Kricheldorf et al., "Cholesteric and photoreactive polyesters," Reactive & Functional Polymers, 30, pp. 173–189 (1996).

Mustapha Majdoub et al., Nouveaux Polyéthers Et Polyesters À Base D'Isosorbide: Synthèse Et Caractérisation, Eur. Polym. J., vol. 30, No. 12, pp. 1431–1437 (1994).

Masahiko Okada et al., "Synthesis and biodegradability of polyesters based on 1,4:3,6–dianhydrohexitols and sucinic acid derivatives," in *Biodegradable Plastics and Polymers*, Eds. Y. Doi and K. Fukada, Elsevier Science B.V., pp. 511–518 (1994).

Masahiko Okada et al., "Synthesis and Degradabilities of Polyesters from 1,4:3,6–Dianhydrohexitols and Aliphatic Dicarboxylic Acids," Journal of Polymer Science: Part A: Polymer Chemistry, vol. 33, pp. 2813–2820 (1995).

Masahiko Okada et al., "Biodegradable Polymers Based on Renewable Resources: Polyesters Composed of 1,4:3,6–Dianhydrohexitol and Aliphatic Dicarboxylic Acid Units, "Journal of Applied Polymer Science, vol. 62, pp. 2257–2265 (1996).

Martin Reinecke and Helmut Ritter, "Branching and crosslinking of an unsaturated oligoester with furfurylamides and sorbic acid amides via Diels–Alder additions," Makromol. Chem. 194 pp. 2385–2393 (1993).

Joachim Thiem et al., "Synthesis of Polyterephthalates Derived from Dianhydrohexitols," Polymer Bulletin 11, pp. 365–369 (1984).

J. Thiem et al., "Darstellung und gezielte Polykondensation von Anhydroalditol–Bausteinen aus Stärke", starch/stärke, 36, Nr.5, pp. 170–176 (1984).

Sirinat Wilbullucksanakul et al., "Synthesis of polyurethanes from saccharide–derived diols and diisocyantes and their hydrolyzability," Macromol. Chem., Phys. 197, pp. 135–146 (1996).

V.L. Lapenkov et al., "Polyvinyl ethers of dianhydro derivatives of mannitol and sorbitol," Ref. Zh., Khim. 1973, Abstr. No. 15S298.

Stanislaw Ropuszynski et al., "Preparation of oxyethylene derivatives of esters of dianhydroglucitol and some higher fatty acids and study of their properties," Abstract; Pr. Nauk. Inst. Technol. Org. Tworzyw Sztucznych Politech. Wroclaw., No. 3, pp. 15–38 (1971) with Abstract.

Chemical Abstracts vol. 62, col. 10588, Neth. App. 6,405, 497 (1965).

Encyclopedia Dictionary of Commercial Polymer Blends, Ed. L.A. Utracki, ChemTec Publishing, pp. 10–11, 23, 35–43 (1994).

"Plastics processing," *McGraw–Hill Encyclopedia of Science & Technology*, $6^{th}$ Edition, pp. 35–40 (1987).

"Plastics Processing," *The Way Things Work*, vol. 2, pp. 56–59 (1971).

*Polymer Alloys and Blends:Thermodynamics and Rheology*, Ed. L.A. Utracki, Hanser Publishers, pp. 256–270, 275–280, 287–293, 297–299 (1990).

*Polymeric Materials Encyclopedia*, "Polyesters (Derived from Renewable Sources)" vol. 8, pp. 5891–96, CPC Press, Inc. (1996).

Dietrich Braun and Matthias Bergmann "1,4:3,6–Dianhydrohexite als Bausteine Für Polymere" J. prakt. Chem. 334, p. 298–310 (1992).

Hans R. Kricheldorf, "'Sugar Diols' as Building Blocks of Polycondensates," J.M.S.—Rev. Macromol. Chem. Phys., C37(4), pp. 599–631 (1997).

Reinhard Storbeck, Matthias Rehahn and Matthias Ballauff, "Synthesis and properties of high–molecular–weight polyesters based on 1,4,:3,6–dianhydrohexitols and terephthalic acid," Makromol. Chem. 194, pp. 53–64 (1993).

Reinhard Storbeck,"Synthese und Charakterisierung von Polyestern auf Basis nachwachsender Rohstoffe," Dissertation, Universität Karlsruhe, 1994.

Reinhard Storbeck and Matthias Ballauff, "Synthesis and Thermal Analysis of Copolyesters Deriving from 1,4:3, 6–Dianhydrosorbitol, Ethylene Glycol, and Terephthalic Acid," Journal of Applied Polymer Science, vol. 59, pp. 1199–1202 (1996).

OPTICAL ARTICLES COMPRISING ISOSORBIDE POLYESTERS AND METHOD FOR MAKING SAME

RELATED APPLICATIONS

The following copending applications, filed on even date herewith, all contain related subject matter: U.S. application Ser. Nos.: 09/064,844, 09/086,064, 09/064,858, 09/064,826, 09/064,719, 09/064,862, 09/064,720. The contents of each of the above-identified applications is hereby incorporated by reference.

FIELD OF THE DISCLOSURE

This invention relates generally to the field of optical articles, such as compact discs, and more specifically to optical articles comprising specific polymeric materials and to methods of making optical articles comprising these polymeric materials.

BACKGROUND OF THE DISCLOSURE

Optical storage in the compact disc (CD) format has gained wide use in the computer, publishing and consumer markets as a low cost and convenient method of storing information. Digital information is stored in a substrate by means of pits and grooves which are read out with a laser light source. As the technology of optical storage advances to the Digital Versatile Disc (DVD), the density of information on the substrate will need to be increased by making the pits even smaller and closer to one another. Erasable CD's will also create more demands on the resins used in the CDs. Therefore, improvements are needed in the resins and in the manufacturing processes for making CD's and DVD's.

In CD and DVD manufacturing processes, information is encoded in the form of pits and grooves that are replicated from a stamper in a mold onto a plastic substrate. The substrate is then metallized so that the readout laser is reflected from the encoded pits. The CD, after stamping and metallization, is coated with a lacquer or resin which protects the disc and which can be marked with ink for labeling and identification. DVD's are similar to CD's in manufacture, but may also have an added semireflecting layer to encode an additional layer of information on top of the first (replicated) surface. For DVD's, two discs are bonded together with a transparent adhesive to double the information content. The DVD disc is then read from the top and bottom using two light sources.

In the case of recordable CD's and DVD's, a continuous groove or track is molded into the substrate for laser tracking. Then, a phase change material (a dye solution or an inorganic alloy) is spin coated or deposited onto the plastic substrate. A metal alloy, preferably gold, is deposited onto the recording media to reflect the reading laser beam. Finally, a coating is applied to protect the metal layer.

The molding of CD's with fast cycle times requires a plastic resin with a special combination of rheological, mechanical, thermal, water absorption, and optical characteristics. One of the most important properties is a low melt viscosity, which may be achieved by reducing the molecular weight of the polymer. Low melt viscosity enables fast injection molding and also fast relaxation of the birefringence and mechanical stresses in the molded disc before the polymer solidifies. Mechanical properties such as stiffness, shrinkage and impact resistance are important to obtain molded discs that are flat, that have good pit replication, and that are mechanically robust. Resistance to heat is desirable because compact discs are used and stored in uncontrolled environments, such as the inside of an automobile, where temperatures can be very high. Low water absorption is important so that the molded discs retain their performance characteristics in high humidity and temperature. Good adhesion to metal in high humidity is important for long term information storage capability. The optical characteristics of the plastic material include a low stress optic coefficient and high optical transmission so that the laser beam passes through the substrate and is reflected with minimum distortion. The principal performance standards that compact discs must meet are related to fidelity of pit replication (information content), low birefringence in substrate (optical signal fidelity), and flatness of disc (no wobble in rotating disc).

It is difficult for a plastic resin to meet all of the above requirements. For example, polymers with melt viscosity that has been reduced by lowering the molecular weight generally have poor mechanical properties. A number of plastics have been proposed or used, including polycarbonates, acrylics, polyesters, polystyrene and cyclic olefin copolymers. Bisphenol-A polycarbonate and acrylic polymers are the most widely used, mainly because of their high optical transmission, excellent mechanical properties (polycarbonate) and low birefringence (acrylics). However, these materials have a number of disadvantages, including a high stress optic coefficient (polycarbonate), high water absorption (acrylic), and poor metallization (acrylic). There is therefore a need for an improved optical quality plastic resin as a substrate material for compact discs.

Plastics that can be used in CD's and DVD's ("optical plastics") have sufficiently good optical properties so that they can be used in other optical articles as well. The term, "optical articles" as used herein refers to articles that are used in optical applications. Optical articles deal with light, including the effects that the light produces and undergoes, and are used in the generation, propagation, and/or transmission of light. "Optical plastics" are plastics that have optical properties that make them suitable for use in optical articles. Optical articles include lenses, such as Fresnel lenses, instrument panel windows and covers, prismatic reflectors, optical fibers, CD's, DVD's, and transparent sheets and films. Molded lenses can be used for such applications as the directing of light beams and images. Plastic lenses are useful because additional mechanical features and fittings can easily be incorporated into the lens design and because they are easy to produce by molding. The materials requirements for lenses are similar to those of compact discs.

The diol 1,4:3,6-dianhydro-D-sorbitol, referred to hereinafter as isosorbide, the structure of which is illustrated below, is readily made from renewable resources, such as sugars and starches. For example, isosorbide can be made from D-glucose by hydrogenation followed by acid-catalyzed dehydration.

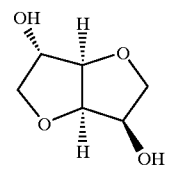

Isosorbide has been incorporated as a monomer into polyesters that also include terephthaloyl moieties. See, for example, R. Storbeck et al, *Makromol.Chem.*, Vol. 194, pp.

53–64 (1993); R. Storbeck et al, *Polymer,* Vol. 34, p. 5003 (1993). However, it is generally believed that secondary alcohols such as isosorbide have poor reactivity and are sensitive to acid-catalyzed reactions. See, for example, D. Braun et al., *J. Prakt.Chem.,* Vol. 334, pp. 298–310 (1992). As a result of the poor reactivity, polyesters made with an isosorbide monomer and esters of terephthalic acid are expected to have a relatively low molecular weight. Ballauff et al, Polyesters (Derived from Renewable Sources), Polymeric Materials Encyclopedia, Vol. 8, p. 5892 (1996).

Copolymers containing isosorbide moieties, ethylene glycol moieties, and terephthaloyl moieties have been reported only rarely. A copolymer containing these three moieties, in which the mole ratio of ethylene glycol to isosorbide was about 90:10, was reported in published German Patent Application No. 1,263,981 (1968). The polymer was used as a minor component (about 10%) of a blend with polypropylene to improve the dyeability of polypropylene fiber. It was made by melt polymerization of dimethyl terephthalate, ethylene glycol, and isosorbide, but the conditions, which were described only in general terms in the publication, would not have given a polymer having a high molecular weight.

Copolymers of these same three monomers were described again recently, where it was observed that the glass transition temperature Tg of the copolymer increases with isosorbide monomer content up to about 200° C. for the isosorbide terephthalate homopolymer. The polymer samples were made by reacting terephthaloyl dichloride in solution with the diol monomers. This method yielded a copolymer with a molecular weight that is apparently higher than was obtained in the German Patent Application described above but still relatively low when compared against other polyester polymers and copolymers. Further, these polymers were made by solution polymerization and were thus free of diethylene glycol moieties as a product of polymerization. See R. Storbeck, Dissertation, Universitat Karlsruhe (1994); R. Storbeck, et al., *J. Appl. Polymer Science,* Vol. 59, pp. 1199–1202 (1996).

U.S. Pat. No. 4,418,174 describes a process for the preparation of polyesters useful as raw materials in the production of aqueous stoving lacquers. The polyesters are prepared with an alcohol and an acid. One of the many preferred alcohols is dianhydrosorbitol. However, the average molecular weight of the polyesters is from 1,000 to 10,000, and no polyester actually containing a dianhydrosorbitol moiety was made.

U.S. Pat. No. 5,179,143 describes a process for the preparation of compression molded materials. Also, described therein are hydroxyl containing polyesters. These hydroxyl containing polyesters are listed to include polyhydric alcohols, including 1,4:3,6-dianhydrosorbitol. Again, however, the highest molecular weights reported are relatively low, i.e. 400 to 10,000, and no polyester actually containing the 1,4:3,6-dianhydrosorbitol moiety was made.

Published PCT Applications WO 97/14739 and WO 96/25449 describe cholesteric and nematic liquid crystalline polyesters that include isosorbide moieties as monomer units. Such polyesters have relatively low molecular weights and are not isotropic.

SUMMARY OF THE DISCLOSURE

Contrary to the teachings and expectations that have been published in the prior art, isotropic, i.e. semi-crystalline and amorphous or nonliquid crystalline, copolyesters containing terephthaloyl moieties, ethylene glycol moieties, isosorbide moieties and, optionally, diethylene glycol moieties are readily synthesized in molecular weights that are suitable for making optical articles on an industrial scale.

In a preferred embodiment, the number of terephthaloyl moieties in the polymer is in the range of about 25% to about 50 mole % (mole % of the total polymer). The polymer may also include amounts of one or more other aromatic diacid moieties such as, for example, those derived from isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid, at combined levels up to about 25 mole % (mole % of the total polymer).

In a preferred embodiment, ethylene glycol monomer units are present in amounts of about 5 mole % to about 49.75 mole %. The polymer may also contain diethylene glycol moieties. Depending on the method of manufacture, the amount of diethylene glycol moieties is in the range of about 0.0 mole % to about 25 mole %.

In a preferred embodiment, isosorbide is present in the polymer in amounts in the range of about 0.25 mole % to about 40 mole %. One or more other diol monomer units may also be included in amounts up to a total of about 45 mole %.

Of course, all of the percentages are dependent on the particular application desired. Desirably, however, equimolar amounts of diacid monomer units and diol monomer units are present in the polymer. This balance is desirable to achieve a high molecular weight.

The polymers having these compositions have glass transition temperatures, as measured by differential scanning calorimetry, of about 85° C. to about 196° C., with preferred compositions generally having Tg's of about 90° to about 165° C. The polymers have inherent viscosities of about 0.35 to about 0.60 dL/g, preferably about 0.4 to about 0.5 dL/g, measured on a 1% solution (weight/volume) in o-chlorophenol at 25° C. Polymers in this composition range are amorphous (or may be quenched to become amorphous), transparent, and have low birefringence. Polymer compositions that are amorphous because they are quenched are slow to crystallize, even when they are heated above the glass transition temperature.

The copolymer is shaped into articles that may be used in optical applications (i.e. optical articles). These articles include substrates for compact discs and DVD's and the finished product therefrom, including lenses, Fresnel lenses, instrument panel windows and covers, prismatic reflectors, thin and thick transparent films and sheets, optical fibers, and the like. The preferred shaped articles are compact discs and DVD's, substrates for making CD's and DVD's, and lenses, including Fresnel lenses. The finished CD's and DVD's have pits on the surface of the discs in a CD or DVD format. They also have a reflective layer (usually metal) and a protective coating, such as a lacquer. DVD's may also include additional layers to conform to the DVD format, such as additional reflective or semi-reflective layers, additional protective layers, and more than one disc stacked together.

The copolymer is formed into these optical articles by one or more methods commonly used for shaping and fabricating plastics, including injection molding, compression molding, extrusion through a die, which may be designed to make fibers, films, sheets, rods, and other shaped objects, calendaring, embossing, stamping, and injection/compression molding. The preferred methods of fabrication are injection molding and injection/compression molding, with the preferred shaped articles being discs for CD's and DVD's.

The invention also comprises a method of making discs, CD's and DVD's, lenses, and other optical articles by shaping the polymer that includes moieties of terephthalic acid, isosorbide and ethylene glycol described above into a disc or other shape by injection molding. In the case of discs, the discs may have pits already molded onto the surface of the disc in a CD or DVD format during injection molding or combined injection/compression molding for read-only discs, or they may have only grooves in the case of recordable discs. Pits or other marks readable with a laser may be created in recordable discs through application of focused laser radiation to a coating that is changed (e.g., melted) by the focused laser. In all cases, the discs are further fabricated by application of other coatings and layers to make a finished CD or DVD. These coatings and layers include a reflective coating (usually a metal), a protective coating (e.g., a lacquer), and other reflective, semi-reflective or transparent layers or coatings and additional discs as needed to conform to a CD or DVD format.

The shaped optical articles using the above polymers have a number of attractive properties, including high optical transmission in thick substrates, good pit replication, good metal adhesion, low birefringence, which results in low optical retardation in CD substrates, mechanical rigidity at high temperature, high heat distortion temperature, low shrinkage, low moisture absorption, and good scratch resistance.

DETAILED DESCRIPTION OF THE PREFERRED EMBODIMENTS OF THE DISCLOSURE

The isotropic polyester polymer, described in detail below, may be made by the melt condensation of a combination of monomers containing an ethylene glycol moiety, an isosorbide moiety and terephthaloyl moiety. Small amounts of other monomers may be added during the polymerization or may be produced as by-products during the reaction.

In a preferred embodiment, ethylene glycol monomer units are present in amounts of about 5 mole % to about 49.75 mole %, preferably 10 mole % to about 49.5 mole %, more preferably about 25 mole % to about 48 mole %, more preferably about 15 mole % to about 40 mole % and alternatively about 15 mole % to about 38 mole %. The polymer may also contain diethylene glycol monomer units. Depending on the method of manufacture, the amount of diethylene glycol monomer units is in the range of about 0.0 mole % to about 25 mole %, preferably 0.25 mole % to about 10 mole %, and more preferably 0.25 mole % to about 5 mole %. Diethylene glycol may be produced as a by-product of the polymerization process, and may also be added to help accurately regulate the amount of diethylene glycol monomer units that are in the polymer.

In a preferred embodiment, isosorbide moieties are present in the polymer in amounts in the range of about 0.25 mole % to about 40 mole %, preferably about 0.25 mole % to about 30 mole % and more preferably about 0.5 mole % to 20 mole % and alternatively 12 mole % to 20 mole %. Depending on the application, isosorbide may be present in any desirable range such as 1 mole % to 3 mole %, 1 mole % to 6 mole %, 1 mole % to 8 mole % and 1 mole % to 20 mole %.

The lower limit of isosorbide in the most preferred compositions above without the optional comonomers other than ethylene glycol, is approximately the minimum amount of isosorbide needed to make the polymer completely amorphous, regardless of processing. Polymers with less than 12 mole % isosorbide can be made amorphous by quenching them from the melt. These are slow to crystallize under conditions where crystallization can take place. Higher levels of isosorbide yield polymers that are both amorphous and have a higher glass transition temperature (Tg). Polymers that are always amorphous and have a higher Tg are preferred for use in environments where the optical articles may be exposed to elevated temperatures, which could result in crystallization in the compositions that have been quenched to make them amorphous.

One or more other diol monomer units may optionally be included in amounts up to a total of about 45 mole %, preferably less than 20 mole %, and even more preferably less than 15 mole %, even more preferably less than 10 mole % and even more preferably less than 2 mole %. Examples of these optional other diol units include aliphatic alkylene glycols having from 3–12 carbon atoms and having the empirical formula HO—$C_nH_{2n}$—OH, where n is an integer from 3–12, including branched diols such as 2,2-dimethyl-1,3-propanediol; cis or trans-1,4-cyclohexanedimethanol and mixtures of the cis and trans isomers; triethylene glycol; 2,2-bis[4-(2-hydroxyethoxy)phenyl]propane; 1,1-bis[4-(2-hydroxyethoxy)phenyl]cyclohexane; 9,9-bis[4-(2-hydroxyethoxy)phenyl]fluorene; 1,4:3,6-dianhydromannitol; 1,4:3,6-dianhydroiditol; and 1,4-anhydroerythritol.

In a preferred embodiment, the number of terephthaloyl moieties in the polymer is in the range of about 25 mole % to about 50 mole %, more preferably about 40 mole % to about 50 mole %, even more preferably about 45 mole % to about 50 mole % (mole % of the total polymer). The polymer may also include amounts of one or more other aromatic diacid moieties such as, for example, those derived from isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid, at combined levels up to about 25 mole %, preferably up to 10 mole %, more preferably up to about 5 mole % (mole % of the total polymer).

Of course, all of the percentages are dependent on the particular application desired. Desirably, however, equimolar amounts of diacid monomer units and diol monomer units are present in the polymer. This balance is desirable to achieve a high molecular weight.

The polyester has an inherent viscosity, which is an indicator of molecular weight, of at least about 0.35 dL/g, as measured on a 1% (weight/volume) solution of the polymer in o-chlorophenol at a temperature of 25° C. This inherent viscosity is sufficient for some applications, such as some optical articles and coatings. For CD's and DVD's, an inherent viscosity of at least about 0.4 dL/g to 0.5 dL/g is preferred. Higher inherent viscosities are needed for many other applications (e.g., bottles, films, sheet, molding resin). The conditions can be adjusted to obtain desired inherent viscosities up to at least about 0.5 dL/g and desirably higher than 0.65 dL/g. Further processing to the polyester may achieve inherent viscosities of 0.7, 0.8, 0.9, 1.0, 1.5, 2.0 dL/g and even higher.

The molecular weight is normally not measured directly. Instead, the inherent viscosity of the polymer in solution or the melt viscosity is used as an indicator of molecular weight. For the present polymers, the inherent viscosity is measured by the method described previously, with a molecular weight corresponding to an inherent viscosity of about 0.35 or more being sufficient for some uses. Higher molecular weights, corresponding to inherent viscosities of about 0.45 or more, may be required for other applications. Generally, the inherent viscosity/molecular weight relationship can be fitted to a linear equation:

$$\log(IV)=0.5856\times\log(Mw)-2.9672.$$

The inherent viscosities are a better indicator of molecular weight for comparisons of samples and are used as the indicator of molecular weight herein.

These polymers are made by any of several methods. These methods include melt condensation of the diacid and diol monomers and the reaction of the diol monomers with the acid chlorides of terephthalic acid and any other acids that may be present. The reaction of terephthaloyl dichloride with isosorbide and ethylene glycol is readily carried out by combining the monomers in a solvent (e.g., toluene) in the presence of a base, such as pyridine, which neutralizes HCl as it is produced. This procedure is described in R. Storbeck et al., *J. Appl. Polymer Science,* Vol. 59, pp. 1199–1202 (1996). Other well-known variations with diols and terephthaloyl chloride may also be used (e.g., interfacial polymerization or heating the monomers in the melt phase without a solvent).

When the polymer is made using the acid chlorides, the ratio of monomer units in the product polymer is about the same as the ratio of reacting monomers. Therefore, the ratio of monomers charged to the reactor is the same as the desired ratio in the product. A slight excess of diol or diacid or a trace amount of a monofunctional capping group may be necessary to reduce the molecular weight of the polymer so that is has an inherent viscosity in the desired range. For example, an inherent viscosity in the range of about 0.40— 0.50 dL/g is suitable for use in the manufacture of optical articles, such as CD and DVD substrates and lenses. Such adjustments in stoichiometry and conditions are readily made by practitioners in the art.

The melt process conditions of the present invention, particularly the amounts of monomers used, depend on the polymer composition that is desired. The amount of diol and diacid or dimethyl ester thereof are desirably chosen so that the final polymeric product contains the desired amounts of the various monomer units, desirably with equimolar amounts of monomer units derived from the diols and the diacids. Because of the volatility of some of the monomers, including isosorbide, and depending on such variables as whether the reactor is sealed (i.e. is under pressure) and the efficiency of the distillation columns used in synthesizing the polymer, some of the monomers may need to be included in excess at the beginning of the polymerization reaction and removed by distillation as the reaction proceeds. This is particularly true of ethylene glycol and isosorbide.

The exact amount of monomers to be charged to a particular reactor is readily determined by a skilled practitioner, but often will be in the ranges below. Excesses of ethylene glycol and isosorbide are desirably charged, and the excess ethylene glycol and isosorbide are removed by distillation or other means of evaporation as the polymerization reaction proceeds. Terephthalic acid or dimethyl terephthalate is desirably included in an amount of about 50% to about 100 mole %, more preferably 80 mole % to about 100 mole % of the diacid monomers that are charged, with the remainder being the optional diacid monomers. Isosorbide is desirably charged in an amount of about 0.25 mole % to about 150 mole % or more compared with the total amount of diacid monomers. The use of diethylene glycol monomer is optional, and is often made in situ. If diethylene glycol is added, it is charged in an amount up to about 20 mole % of the total amount of diacid monomers. Ethylene glycol is charged in an amount in the range of about 5 mole % to about 300 mole %, desirably 20 mole % to about 300 mole % of the diacid monomers, and the optional other diols are charged in an amount up to about 100 mole % of the diacid monomers.

The ranges given for the monomers are very wide because of the wide variation in monomer loss during polymerization, depending on the efficiency of distillation columns and other kinds of recovery and recycle systems, and are only an approximation. Exact amounts of monomers that are charged to a specific reactor to achieve a specific composition are readily determined by a skilled practitioner.

In the polymerization process, the monomers are combined, and are heated gradually with mixing with a catalyst or catalyst mixture to a temperature in the range of about 260° C. to about 300° C., desirably 280° C. to about 285° C. The exact conditions and the catalysts depend on whether the diacids are polymerized as true acids or as dimethyl esters. The catalyst may be included initially with the reactants, and/or may be added one or more times to the mixture as it is heated. The catalyst used may be modified as the reaction proceeds. The heating and stirring are continued for a sufficient time and to a sufficient temperature, generally with removal by distillation of excess reactants, to yield a molten polymer having a high enough molecular weight to be suitable for making the desired products.

Catalysts that may be used include salts of Li, Ca, Mg, Mn, Zn, Pb, Sb, Sn, Ge, and Ti, such as acetate salts and oxides, including glycol adducts, and Ti alkoxides. These are generally known in the art, and the specific catalyst or combination or sequence of catalysts used may be readily selected by a skilled practitioner. The preferred catalyst and preferred conditions differ depending on whether the diacid monomer is polymerized as the free diacid or as a dimethyl ester. Germanium and antimony containing catalysts are the most preferred.

It is desirable to have an amorphous polymer to make transparent optical articles. To make an amorphous polymer, the amount of isosorbide moiety is desirably in the range of about 2% to about 30% on a molar basis, the ethylene glycol moieties are present in an amount of about 10% to about 48% on a molar basis, optional other diols such as 1,4-cyclohexanedimethanol moieties are present in an amount up to about 45% on a molar basis, diethylene glycol moieties are present in an amount of about 0.0% to about 5%, preferably 0.25% to about 5% on a molar basis, terephthaloyl moieties are present at a level of about 25% to about 50%, and other optional diacid moieties, such as 2,6-naphthalenedicarboxylic acid, isophthalic acid, 4,4'-bibenzoic acid, and mixtures thereof, are present in amounts up to a total of about 25%, on a molar basis.

Some of these compositions (i.e. those having isosorbide at levels of less than about 12%) are semi-crystalline if they are cooled slowly from the melt or if they are annealed above their glass transition temperatures, but are amorphous if they are cooled rapidly from the melt. In general, the compositions that can be semi-crystalline are slower to crystallize than poly(ethylene terephthalate) compositions, so that it is easier to make transparent articles that remain transparent using crystallizable copolymers even though they may be exposed to conditions under which they can crystallize.

The melt polymerization process of the present invention is desirably carried out using either dimethyl esters (e.g., dimethyl terephthalate) as reactants or using the free diacid as a reactant. Each process has its own preferred catalysts and preferred conditions. These are described generally below. These are analogous to the well-known processes for making poly(ethylene terephthalate). The usefulness of these methods in obtaining high molecular weight polymer is surprising in view of the disclosures by others who have worked with isosorbide polyesters and in view of the generally held expectations that secondary diols have low reactivities and esters of secondary alcohols have reduced thermal stability. These two processes are somewhat different and are described below.

Dimethyl Terephthalate Process

In this process, which is carried out in two steps, terephthalic acid and the optional diacid monomers, if present, are used as their dimethyl ester derivatives. In minor amounts, e.g., 1–2 wt %, free acids may also be added. The diols (e.g., ethylene glycol and isosorbide) are mixed with the dimethyl ester of the aromatic diacid (e.g., dimethyl terephthalate) in the presence of an ester interchange catalyst, which causes exchange of the ethylene glycol for the methyl group of the dimethyl esters through a transesterification reaction. This results in the formation of methanol, which distills out of the reaction flask, and bis (2-hydroxyethylterephthalate). Because of the stoichiometry of this reaction, somewhat more than two moles of ethylene glycol are desirably added as reactants for the ester interchange reaction.

Catalysts that bring about ester interchange include salts (usually acetates) of the following metals: Li, Ca, Mg, Mn, Zn, Pb, and combinations thereof, $Ti(OR)_4$, where R is an alkyl group having 2–12 carbon atoms, and PbO. The catalyst components are generally included in an amount of about 10 ppm to about 100 ppm. Preferred catalysts for ester interchange include $Mn(OAc)_2$, $Co(OAc)_2$, and $Zn(OAc)_2$, where OAc is the abbreviation for acetate, and combinations thereof. The polycondensation catalyst in the second stage of the reaction, preferably Sb(III) oxide, may be added now or at the start of the polycondensation stage. A catalyst that has been used with particularly good success is based on salts of Mn(II) and Co(II), at levels of about 50 to about 100 ppm, each. These were used in the form of Mn(II) acetate tetrahydrate and Co(II) acetate tetrahydrate, although other salts of the same metals may also be used.

Ester interchange is desirably brought about by heating and stirring the mixture of reactants under an inert atmosphere (e.g., nitrogen) at atmospheric pressure from room temperature to a temperature high enough to induce the ester interchange (about 150° C.). Methanol is formed as a by-product and distills out of the reactor. The reaction is gradually heated to about 250° C. until methanol evolution stops. The end of methanol evolution can be recognized by a drop in the overhead temperature of the reaction vessel.

A small amount of an additive having a boiling point of 170–240° C. may be added to the ester interchange to aid in the heat transfer within the reaction medium and to help retain volatile components in the vessel that may sublime into the packed column. The additive must be inert and not react with alcohols or DMT at temperatures below 300° C. Preferably, the additive has a boiling point greater than 170° C., more preferably within the range of 170° C. to 240° C., and is used in an amount between about 0.05 and 10 wt %, more preferably between about 0.25 and 1 wt % of reaction mixture. A preferred additive is tetrahydronaphthalene. Other examples include diphenyl ether, diphenyl sulfone and benzophenone. Other such solvents are described in U.S. Pat. No. 4,294,956, the contents of which are hereby incorporated by reference.

The second stage of the reaction is commenced by adding a polycondensation catalyst and a sequestering agent for the transesterification catalyst. Polyphosphoric acid is an example of a sequestering agent and is normally added in an amount of about 10 to about 100 ppm of phosphorous per gm of dimethyl terephthalate. An example of a polycondensation catalyst is antimony (III) oxide, which may be used at a level of 100 to about 400 ppm.

The polycondensation reaction is typically carried out at a temperature from about 250° C. to 285° C. During this time, ethylene glycol distills out of the reaction due to condensation of the bis(2-hydroxyethyl) terephthalate to form polymer and by-product ethylene glycol, which is collected as a distillate.

The polycondensation reaction described above is preferably carried out under vacuum, which can be applied while the reactor is being heated to the temperature of the polycondensation reaction after polyphosphoric acid and Sb(III) oxide have been added. Alternatively, vacuum can be applied after the polycondensation reaction temperature reaches 280° C.–285° C. In either case, the reaction is accelerated by the application of vacuum. Heating under vacuum is continued until the molten polymer reaches the desired molecular weight, usually recognized by an increase in the melt viscosity to a pre-determined level. This is observed as an increase in the torque needed for the stirring motor to maintain stirring. An inherent viscosity of at least 0.5 dL/g, and generally up to about 0.65 dL/g or greater can be achieved by this melt polymerization process without further efforts at raising molecular weight.

Terephthalic Acid Process

The terephthalic acid process is similar to the dimethyl terephthalate process except that the initial esterification reaction that leads to bis(2-hydroxyethylterephthalate) and other low molecular weight esters is carried out at a slightly elevated pressure (autogenous pressure, about 25 to 50 psig). Instead of a two-fold excess of diols, a smaller excess (about 10% to about 60%) of diols (ethylene glycol, isosorbide and other diols, if any) is used. The intermediate esterification product is a mixture of oligomers, since not enough diol is present to generate a diester of terephthalic acid. The catalysts are also different. No added catalyst is necessary in the esterification reaction.

A polycondensation catalyst (e.g., Sb(III) or Ti(IV) salts) is still desirable to achieve a high molecular weight-polymer. The catalyst that is needed to achieve a high molecular weight can be added after the esterification reaction, or it can be conveniently charged with the reactants at the beginning of the reaction. Catalysts that are useful for making a high molecular weight polymer directly from terephthalic acid and the diols include the acetate or other alkanoate salts of Co(II) and Sb(III), oxides of Sb(III) and Ge(IV), and $Ti(OR)_4$ (where R is an alkyl group having 2 to 12 carbon atoms). Glycol solubilized oxides of these metal salts may also be used. The use of these and other catalysts in the preparation of polyesters is well-known in the art.

The reaction may be carried out in discrete steps, but this is not necessary. In practice on a large scale, it may be carried out in steps as the reactants and intermediate products are pumped from reactor to reactor at increasing temperatures. In a batch process, the reactants and catalyst may be charged to a reactor at room temperature and then gradually heated to about 285° C. as polymer forms. The pressure is vented in the range of about 200° C. to about 250° C., and a vacuum is then desirably applied.

Esterification to form bis(2-hydroxyethylterephthalate) esters and oligomers takes place at elevated temperatures (between room temperature and about 220° C. to 265° C. under autogenous pressure), and polymer is made at temperatures in the range of about 275° C. to about 285° C. under a high vacuum (less than 10 Torr, preferably less than 1 Torr). The vacuum is needed to remove residual ethylene glycol and water vapor from the reaction to raise the molecular weight.

A polymer having an inherent viscosity of at least 0.5 dL/g, and generally up to about 0.65 dL/g can be achieved by the direct polymerization process, without subsequent solid state polymerization. The progress of the polymerization can be followed by the melt viscosity, which is easily observed by the torque that is required to maintain stirring of the molten polymer.

Solid State Polymerization

For certain composition ranges, the molecular weight can be increased further by solid state polymerization. However, in general, solid state polymerization is not needed for most optical articles because sufficient molecular weight is achieved in the melt polymerization reaction. Solid state polymerization, if desired, is described in application Ser. No. U.S. Pat. No. 5,959,066, filed on an even date herewith, the contents of which are hereby incorporated by reference.

Use of the Polymers in Making Optical Articles

The amorphous, transparent polymers produced by the above process may be mixed with other additives prior to being molded into optical articles. One or more additives may be included for such purposes as to improve thermal stability, inhibit oxidation, improve polymer flow characteristics, add color to the polymer, and improve the mold release properties of the polymer. Additives that perform these functions are well known in the art. In the compositions that have been made and molded into discs, ULTRANOX® 628, IRGANOXO® 1010 (Ciba Geigy), IRGAFOS® 168 (Ciba Geigy, Ardsley, N.Y.), and some combinations of these have been used successfully as heat stabilizers. ACROWAX® (from Lonza), Hoechst Wax C (from Hoechst AG, Frankfurt, Germany) and zinc stearate have been added as flow enhancers/mold release agents. The flow enhancers also reduce haze in the molded articles. These may be added at levels of about 0.1% to 0.5% by weight. Other alternative additives and amounts can readily be chosen by practitioners in the art.

The polymeric materials are shaped into optical articles and intermediate products for making optical articles by any of the methods commonly used for shaping polymers. These include injection molding; compression molding; extrusion through a die to make a film, fiber, rod or the like; calendaring; embossing; stamping; and injection/compression molding. The articles made by these methods may be used for such applications as substrates for CD's and DVD's, CD's and DVD's, lenses, Fresnel lenses, instrument panel windows and covers, prismatic reflectors, thin and thick films and sheets, optical fibers, and the like.

The preferred method of shaping the polymers is by injection or compression molding or combined injection/compression molding. The preferred optical articles made from these polymers are CD's and DVD's, the substrates from which the CD's and DVD's are made, and lenses, including Fresnel lenses. The polymer that is used for injection molding of these preferred articles preferably has an inherent viscosity of about 0.40 to about 0.50 dL/g, and most preferably about 0.40 to about 0.45 dL/g, where the inherent viscosity is measured on a 1% (weight/volume) solution of polymer in o-chlorophenol at 25° C. This relatively low inherent viscosity is desirable because the polymer has a low enough melt viscosity that it can be injection molded rapidly, with fast relaxation of the birefringence and mechanical stresses that occur during molding before the polymer solidifies. This results in a molded article having low birefringence. An important property of this particular family of polymers is that the polymers have good mechanical and thermal properties, even though the molecular weight is reduced for ease of molding.

This invention is further illustrated by the following non-limiting examples.

EXAMPLE 1

Dimethyl terephthalate (10.68 kg), isosorbide (5.79 kg), ethylene glycol (4.88 kg), and manganese (II) acetate (4.76 g) are placed in a stainless steel stirred reactor under nitrogen purge at atmospheric pressure. The reactor is equipped with a packed distillation column. The monomer composition corresponds to a mole ratio of terephthalic acid: ethylene glycol: isosorbide of 1:1.43:0.72. The mixture is heated with stirring to 230° C. within three hours, to 240° C. during the next hour, and to 265° C. during the following hour. During this time a distillate that is mostly methanol is collected from the packed column. After the temperature reaches 284° C., polyphosphoric acid is added to the reactor. The amount of polyphosphoric acid is equivalent to 402 mg of phosphorous. Germanium (IV) oxide (4.66 g) is added as a solution in ethylene glycol (0.100N GeO$_2$ in ethylene glycol). The pressure inside the reactor is now reduced to 1 mm of mercury over a period of 2 hours. The reaction mixture is kept under vacuum for three more hours, and an additional distillation fraction is collected while the temperature increases to 285° C. Afterwards, the reaction product, a viscous resin, is extruded into a water bath, cut into pellets and dried in an oven. The resin has a glass transition temperature of 106° C. and an inherent viscosity of 0.43 dL/g (measured at 25° C. on a 1% (weight/volume) ortho-chorophenol solution). The monomer composition of the polymer is measured by NMR as 50.1% terephthalate, 33.5% ethylene glycol residue, 2.6% diethylene glycol residue, and 12.9% isosorbide residue, expressed as a mole % of the polymer.

EXAMPLE 2

Purified terephthalic acid (7.48 kg), isosorbide (3.55 kg), and ethylene glycol (1.70 kg) are placed in a stainless steel stirred reactor preheated to 70° C. under nitrogen purge at atmospheric pressure. The reactor is equipped with a packed distillation column. The monomer composition corresponds to a mole ratio of terephthalic acid: ethylene glycol: isosorbide of 1:0.61:0.54. The reactor is heated to 285° C. within three hours and the reaction mixture is kept under a positive pressure of 50–60 psi. During this time, a distillate that is mostly water is collected from the packed column. After the melt temperature reaches at least 275° and the terephthalic acid is essentially consumed, as observed by the clear appearance of the reaction mixture, pressure is released and germanium (IV) oxide catalyst (3.77 g) is added as a solution in ethylene glycol (0.100 N GeO$_2$ in ethylene glycol). The reaction mixture is stirred for an additional 20 minutes. The pressure in the reactor is reduced to 1–2 mm of mercury over the period of 1 hour and an additional distillation fraction is collected. Afterwards, the reaction product, a viscous resin, is extruded into a water bath, cut into pellets and dried in an oven. The resin has a glass transition temperature of 116° C. and an inherent viscosity of 0.43 dL/g (measured at 25° C. in a 1% (w/v) ortho-chlorophenol solution). The monomer composition of the polymer is measured by NMR as 49.5% terephthalate, 30.3% ethylene glycol residue, 2.0% diethylene glycol residue, and 18.2% isosorbide residue, expressed as a mole % of the polymer.

EXAMPLE 3

The polymer of Example 1 is injection molded using an Arburg injection molding machine (Arburg Maschinen Fabrik, Lossburg, Germany) into standard tensile bars for measuring tensile and flexural properties and is also injection molded into discs. The melt temperature is 270° C. and the mold temperature is 30° C. Properties of the polymer and of the molded products are presented in Table 1.

EXAMPLE 4

Compact discs are molded from the polymer described and made in Example 1 using a Uniline 3000 replication line from First Light Technology, Inc. (Saco, Me.). The line consists of an injection molding machine (Netstal Discjet 600, Nafel, Switzerland), a CD mold (ICT Axxicon, Eindhoven, Holland), a metallizer unit, and coating and printing stations. CD's are molded with a barrel temperature of 300° C., a nozzle temperature of 310° C., a mold temperature of 40° C., an injection time of 0.4 seconds, a cooling time of 1.8 seconds, and a total cycle time of 5 seconds. The measured optical and electronic parameters of the molded and metallized discs are presented in Table 2.

Table 2 presents measured values and the specifications that are used in the industry. The specifications in Table 2 are written in accordance with the "Red Book," set forth in the Systems Description Compact Disk Digital Audio (N.V. Phillips, Eindhoven, Holland, and Sony Corporation, Japan). The data in Table 2 fall within these specifications or are below the allowable upper limit. The measurements are standard in the industry and are summarized below.

Retardation is the birefringence times the thickness of the CD substrate. The birefringence is the difference in refractive indices along the radial and tangential directions, respectively. The optical retardation was measured using a Birefringence Analyzer.

Pit depth is measured relative to the height of the bumps on the stamper used to mold the discs. It is measured using an Atomic Force Microscope (AFM, Digital Instruments, Santa Barbara, Calif.).

The remainder of the parameters in Table 2 were measured by a CDCATS SA3 analyzer (Audio Development Informationteknik, Sweden). Deflection refers to the radial deflection of a light beam due to skew and warp in the disc. Pushpull is a measurement of how easily the drive can stay on the track as it follows the signal. (High frequency)HF Signal I3 is a measure of decoding problems. (High frequency)HF Signal I11 is similar to HFI3. Reflectivity is the level of reflected light from the pits. Block Error Rate (BLER) is a measure of blocks of pits that cannot be read or corrected.

It is to be understood that the above-described embodiments are illustrative only and that modification throughout may occur to one skilled in the art. Accordingly, this invention is not to be regarded as limited to the embodiments disclosed herein.

TABLE 1

Properties of Optical Polymer

| Property | Value | Method |
| --- | --- | --- |
| Viscosity (poise) @ 300° C. | 1000 | Dynamic Stress Rheometer (Rheometrics Corp, Piscataway, NJ) |
| Melt index @ 300° C. | 60 | Extrusion Plastometer (Tinius Olsen, Willow Grove, PA) |
| HDT (° C.) @ 264 psi | 80° | ASTM D648 |
| Tg (° C.) | 106° | DSC |
| Density (gm/cc) | 1.35 | ASTM D792 |
| Tensile modulus (Mpsi) | 0.34 | ASTM D638 |
| Tensile elong. @ break (%) | 74% | ASTM D638 |
| Flex. modulus (Mpsi) | 0.37 | ASTM D790 |
| Multiaxial impact energy (ft-lb) @ max load, 20° C. (disc, d = 1.6 mm, 101 mm dia.) | 10.5 | ASTM D3763 |
| Multiaxial impact load (lb) @ max load, 20° C. (disc, d = 1.6 mm, 101 mm dia.) | 477 | ASTM D3763 |
| Mold shrinkage (in/in) | 0.0035 | ASTM D955 |
| water absorption (%) (24 hour water immersion) | 0.27 | ASTM D570 |
| Optical transmission (%) | 87% | ASTM D1003 |
| haze (%) | 0.5 | ASTM D1003 |
| Refractive index | 1.57 | Abbe refractometer |
| Specific optical rotation | −44 | Polarimeter (Digipol-781, Rudolph Instruments, NJ) |

TABLE 2

Measured Properties of Molded CD's

| Property | PEIT disc value | Specification |
| --- | --- | --- |
| Pit depth (% of stamper) | 95 | 85–100 |
| Deflection (degrees) | 0.18 | 1.6 |
| Pushpull | 0.063 | 0.04–0.07 |
| E22 | 4.4 | 15 |
| E32 | 0.2 | 0 |
| HF signal I3 | 0.46 | 0.3–0.7 |
| HF signal I11 | 0.83 | 0.6–1 |
| Symmetry | 0.09 | <0.2 |
| Block error rate (BLER) | 169 | 200 |
| Reflectivity (%) | 78 | 70–100 |
| Retardation (nm) @ 633 nm | 45 nm | 50 nm |

The optical articles of the present invention may also be made with the polyesters described in copending application Ser. No. 09/064,720, filed on even date herewith and the polyester blends described in copending application Ser. No. 09/064,826, filed on even date herewith, the contents of each of which are hereby incorporated by reference.

What is claimed is:

1. An optical article comprising a transparent polymer which comprises terephthaloyl moieties, optionally, other aromatic diacid moieties; ethylene glycol moieties; isosorbide moieties; and, optionally, one or more other diol moieties, wherein said polymer has an inherent viscosity of at least about 0.35 dL/g as measured on a 1% solution (weight/volume) in o-chlorophenol at 25° C.

2. The optical article as recited in claim 1, wherein said polymer has an inherent viscosity in the range of about 0.4 to about 0.5 dL/g.

3. The optical article as recited in claim 1, wherein said optical article is a compact disc, digital versatile disc, substrate for a compact disc or digital versatile disc, lens, instrument panel window or cover, prismatic reflector, film, sheet, or optical fiber.

4. The optical article as recited in claim 1, wherein said terephthaloyl moieties are present in an amount of from about 25 mole % to about 50 mole % of said polymer, wherein said isosorbide moieties are present in an amount from about 0.25 mole % to about 40 mole % of said polymer, wherein said ethylene glycol moieties are present in an amount up to about 49.75 mole % of said polymer wherein said polymer further optionally comprises aromatic diacid moieties other than terephthaloyl moieties in the range of 0 to about 10 mole % of said polymer, and other diol moieties in an amount up to about 15 mole % of said polymer.

5. The optical article as recited in claim 4, wherein said other aromatic diacid moieties are derived from isophthalic acid, 2,5-furandicarboxylic acid, 2,5-thiophenedicarboxylic acid, 2,6-naphthalenedicarboxylic acid, 2,7-naphthalenedicarboxylic acid, 4,4'-bibenzoic acid, or mixtures thereof.

6. The optical article as recited in claim 4, wherein said other diol moieties are derived from aliphatic alkylene glycols or branched diols having from 3–12 carbon atoms and having the empirical formula HO—$C_nH_{2n}$—OH, where n is an integer from 3–12; cis or trans-1,4-cyclohexanedimethanol or mixtures of the cis and trans isomers; diethylene glycol; triethylene glycol; 2,2-bis[4-(2-hydroxyethoxy)phenyl]propane; 1,1-bis[4-(2-hydroxyethoxy)phenyl]cyclohexane; 9,9-bis[4-(2-hydroxyethoxy)phenyl]fluorene; 1,4:3,6-dianhydromannitol; 1,4:3,6-dianhydroiditol; 1,4-anhydroerythritol; or mixtures thereof.

7. The optical article as recited in claim 4, wherein said terephthaloyl moieties are present in an amount from about 45 mole % to about 50 mole % of said polymer, said isosorbide moieties are present in an amount from about 0.25 mole % to about 20 mole % of said polymer, said ethylene glycol moieties are present in an amount from about 5 mole % to about 48 mole % of said polymer, said other diacid moieties are present in an amount from 0 to about 5 mole % of said polymer, and said other diol moieties are present in an amount from 0 to about 2 mole % of said polymer.

8. The optical article as recited in claim 7, wherein said optical article is a compact disc, digital versatile disc, or substrate for compact disc or digital versatile disc.

9. The optical article as recited in claim 8, wherein said polymer has an inherent viscosity in the range of about 0.4 to about 0.5 dL/g.

10. A method of making an optical article, comprising the steps of:
 (a) providing a polymer which comprises terephthaloyl moieties, optionally, other aromatic diacid moieties; ethylene glycol moieties; isosorbide moieties; and, optionally, one or more other diol moieties, wherein said polymer has an inherent viscosity of at least about 0.35 dL/g as measured on a 1% solution (weight/volume) in o-chlorophenol at 25° C.; and
 (b) shaping said polymer into an optical article or a substrate that is used in an optical article.

11. The method as recited in claim 10, wherein said shaping comprises injection molding, compression molding, calendering, embossing, stamping, injection/compression molding or extrusion.

12. The method as recited in claim 11, wherein said extrusion is through a die that yields fibers, films, sheets or rods.

13. The method as recited in claim 10, wherein said polymer has an inherent viscosity in the range of about 0.4 to about 0.5 dL/g.

14. The method as recited in claim 10, wherein said polymer is shaped into a compact disc, digital versatile disc, substrate for compact disc or digital versatile disc, lens, instrument panel window or cover, prismatic reflector or optical fiber.

15. The method as recited in claim 10, wherein said terephthaloyl moieties are present in an amount from about 25 mole % to about 50 mole % of said polymer, wherein said isosorbide moieties are present in an amount from about 0.25 mole % to about 40 mole % of said polymer, said other aromatic diacid moieties are present in an amount from about 0 to about 10 mole % of said polymer, ethylene glycol moieties are present in an amount up to about 49.75 mole % of said polymer, and said other diol moieties are present in an amount up to about 15 mole % of said polymer.

16. The method as recited in claim 15, wherein said other aromatic diacid moieties are derived from isophthalic acid, 2,5-furandicarboxylic acid, 2,5-thiophenedicarboxylic acid, 2,6-naphthalenedicarboxylic acid, 2,7-naphthalenedicarboxylic acid, 4,4'-bibenzoic acid, or mixtures thereof.

17. The method as recited in claim 15, wherein said other diol moieties are derived from aliphatic alkylene glycols or branched diols having from 3–12 carbon atoms and having the empirical formula HO—$C_nH_{2n}$—OH, where n is an integer from 3–12; cis or trans-1,4-cyclohexanedimethanol or mixtures of the cis and trans isomers; diethylene glycol; triethylene glycol; 2,2-bis[4-(2-hydroxyethoxy)phenyl] propane; 1,1-bis[4-(2-hydroxyethoxy)phenyl]cyclohexane; 9,9-bis[4-(2-hydroxyethoxy)phenyl]fluorene; 1,4:3,6-dianhydromannitol; 1,4:3,6-dianhydroiditol; 1,4-anhydroerythritol; or mixtures thereof.

18. The method as recited in claim 15, wherein said terephthaloyl moieties are present in an amount from about 45 mole % to about 50 mole % of said polymer, said isosorbide moieties are present in an amount from about 0.25 mole % to about 20 mole % of said polymer, said ethylene glycol moieties are present in an amount from about 5 mole % to about 48 mole % of said polymer, said other diacid moieties are present in an amount from 0 to about 5 mole % of said polymer, and said other diol moieties are present in an amount from 0 to about 2 mole % of said polymer.

19. The method as recited in claim 18, wherein said polymer is shaped into a compact disc, digital versatile disc, or substrate for compact disc or digital versatile disc.

20. The method as recited in claim 19, wherein said polymer has an inherent viscosity in the range of about 0.4 to about 0.5 dL/g.

21. The method as recited in claim 18, further comprising molding said polymer by injection molding, compression molding or combined injection/compression molding to yield a disc having pits in a compact disc format suitable for reading with a laser; coating said disc with a reflective coating; and coating said disc with a protective coating to yield a compact disc.

22. The method as recited in claim 18, comprising molding said polymer by injection molding, compression molding, or combined injection/compression molding to yield a disc having pits in a digital versatile disc format suitable for reading with a laser; coating said disc with a reflective coating; adding additional reflective layers, semi-reflective layers or both reflective and semi-reflective layers to yield a digital versatile disc.

* * * * *